United States Patent
Waidelich

(10) Patent No.: US 7,556,732 B2
(45) Date of Patent: Jul. 7, 2009

(54) MUST CLARIFICATION MACHINE

(75) Inventor: Gunter Waidelich, Tübingen (DE)

(73) Assignee: Inoxpa, S.A., Girona (ES)

( * ) Notice: Subject to any disclaimer, the term of this patent is extended or adjusted under 35 U.S.C. 154(b) by 0 days.

(21) Appl. No.: 11/953,500

(22) Filed: Dec. 10, 2007

(65) Prior Publication Data
US 2008/0210617 A1    Sep. 4, 2008

(30) Foreign Application Priority Data
Dec. 14, 2006   (ES) ................. 200603168

(51) Int. Cl.
*C02F 1/24* (2006.01)
(52) U.S. Cl. .................... 210/221.1; 426/495
(58) Field of Classification Search ............. 210/221.1; 426/495
See application file for complete search history.

(56) References Cited
U.S. PATENT DOCUMENTS

| | | | | |
|---|---|---|---|---|
| 3,393,802 A | * | 7/1968 | Daman, Jr. et al. | 209/169 |
| 3,393,803 A | * | 7/1968 | Ahlborg et al. | 209/169 |
| 4,212,730 A | * | 7/1980 | Brooks et al. | 209/168 |
| 4,265,739 A | * | 5/1981 | Dalton | 209/169 |
| 5,112,627 A | * | 5/1992 | Perletti et al. | 426/50 |
| 5,205,926 A | * | 4/1993 | Lawrence | 209/168 |

FOREIGN PATENT DOCUMENTS

EP    0838260    4/1998

\* cited by examiner

*Primary Examiner*—Thomas M Lithgow
(74) *Attorney, Agent, or Firm*—Darby & Darby

(57) ABSTRACT

A must clarification device is provided comprising a vat into which the must is introduced in either a continuous flow or in batches. Located within a circular chamber in the vat is a turbine rotatable by external means. The must is introduced into the chamber by a centrally located pipe. An air pipe is located concentrically within the must pipe. The pipes are arranged to create a venturi effect to suck the air into the chamber. The turbine mixes the air and must and expels it from the chamber so that the air bubbles cause the impurities to rise to the surface where they are removed.

4 Claims, 4 Drawing Sheets

MUST CLARIFICATION MACHINE

This application claims the benefit of Spanish Application No. 200603168, filed on Dec. 14, 2006, the entire disclosure of which is incorporated by reference.

OBJECT OF THE INVENTION

This invention relates to a machine for clarification, both as a continuous process and a batch process, of the must obtained after pressing the fruit, particularly grapes, which is the stage prior to obtaining the juice from the fruit, or fermenting it to obtain wine.

The object of this invention focuses on implementing means of injecting air bubbles into the must to cause the must deposits or impurities to float in order to withdraw them and clarify the must.

BACKGROUND OF THE INVENTION

In traditional white- and rosé-wine vinification, thermovinification of red wine, as well as other more specific types of vinification, the must-cleansing process, known as clarification, is a key step in obtaining quality wines.

The presence of deposits or impurities in the must obtained after pressing the fruit leads to problems in the subsequent processes, such as fermentation in the case of grapes. These impurities, besides producing undesirable vegetable aromas, cause the yeast to precipitate, leaving its sediment on the bottom of the fermentation vat, which adversely affects the vinification process.

Clarification of the must can be carried out using various methods: the static method, the centrifugation method, the vacuum rotary-filtration method, and floating.

Static clarification simply comprises natural sedimentation or with the help of must-clarificating products, thus removing the deposits and colloids contained in the must at the bottom of the vat. It is a batch process lasting between 8 and 48 hours and which requires a large amount of energy to keep the must cool in order to accelerate sedimentation, and prevent fermentation from starting.

Clarification using the centrifugation method is a batch process that comprises the removal of deposits from the must by physical separation as a result of centrifugal force applied inside a special machine. It is a process that can be made continuous by incorporating the number of spinners necessary so that while some are working, others are being cleaned, and others are being loaded, the resulting flow therefore being more or less continuous. It is a process that is aggressive with the must, and recommended to process very large volumes of must that do not need to be of high quality.

Clarification by vacuum rotary filtration is a batch process that consists of passing the must, aided by a vacuum force, through a filter composed of a succession of filter-material layers, which is usually of a clayey nature. This is a slow process that is aggressive with the must, particularly recommended to take advantage of deposits neglected by other methods, or musts that are very difficult to clarify or of very low quality.

Finally, we come to the clarification by floating. This is a continuous or batch process that consists of injecting air into the must so that the deposits or impurities contained in it float to the surface of the flotation vat, so that the clean must can be extracted from the bottom. It is a process that is not very aggressive with the must and is recommended for processing large quantities of must. The air is generally forced in by a compressor unit, through injectors located in the base of the flotation vat. Apart from the increase in power consumption implied by this compressor unit, the air injection is produced locally in the application points, and the clarification is therefore not homogeneous.

In the state of the art, European patent no. EP0838260 is known, which describes an apparatus for the aeration and pumping of loaded liquids applicable to the winemaking sector, which includes a motor provided with a vertical shaft with a helical coil. The drawback of this apparatus is that the aeration is produced in a very localised manner in the application point, that is, in the vicinity of the helical coil, not ensuring the aeration to the most distant points.

DESCRIPTION OF THE INVENTION

The machine for continuous and batch must clarification proposed by the invention solves the aforementioned problems, as it includes means to ensure that the dispersion of air bubbles is homogeneous and continuous, throughout the whole volume of must contained in the flotation vat.

For this purpose, and more specifically, the must clarification machine is of the type comprising a flotation vat in which must obtained from fruit pressing, particularly grapes, is introduced through a channel driven by a pump, provided with means for injecting air and making the impurities contained in the must float.

Said means comprise a circular chamber placed in the centre of the internal base of the vat, inside which a turbine actuated by a motor rotates and sucks the must contained in the flotation vat, mixing it with the air, and expelling it through holes on the sides of the circular chamber, having ensured that the must and air admission is through a hole at the top of the chamber provided with two concentric pipes, being the outside one for must entry and the inside one for air entry. The inside pipe is provided with a broadened part at its bottom end, which reduces the cross-section through which the must in the chamber inlet can pass in order to create a depression which sucks ambient air through the inner pipe by means of the "Venturi" effect. In this way, suction of the ambient air is produced without the need for any kind of compressor unit. The turbine rotating inside the circular chamber projects the must-air mixture through the holes in the sides, over the entire base of the flotation vat, thus ensuring uniform and homogeneous distribution of the air bubbles, which will rise to the surface taking the deposits and impurities with it.

The air pipe is provided with a filter to prevent the entry of particles or insects in the ambient air, as well as a valve to regulate the air flow, which in turn determines the size of the air bubbles that will be created.

The pipe conveying the air from the outside crosses the must pipe wall through a curved section, becoming concentric up to the inlet of the circular chamber.

DESCRIPTION OF THE DRAWINGS

To complete the description being given and for the purpose of assisting better comprehension of the invention's characteristics, according to a preferred practical embodiment of said invention, a set of drawings is attached as an integral part of said description in which the following is represented for illustrative but not limitative purposes.

PREFERRED EMBODIMENT OF THE INVENTION

Figure 1:
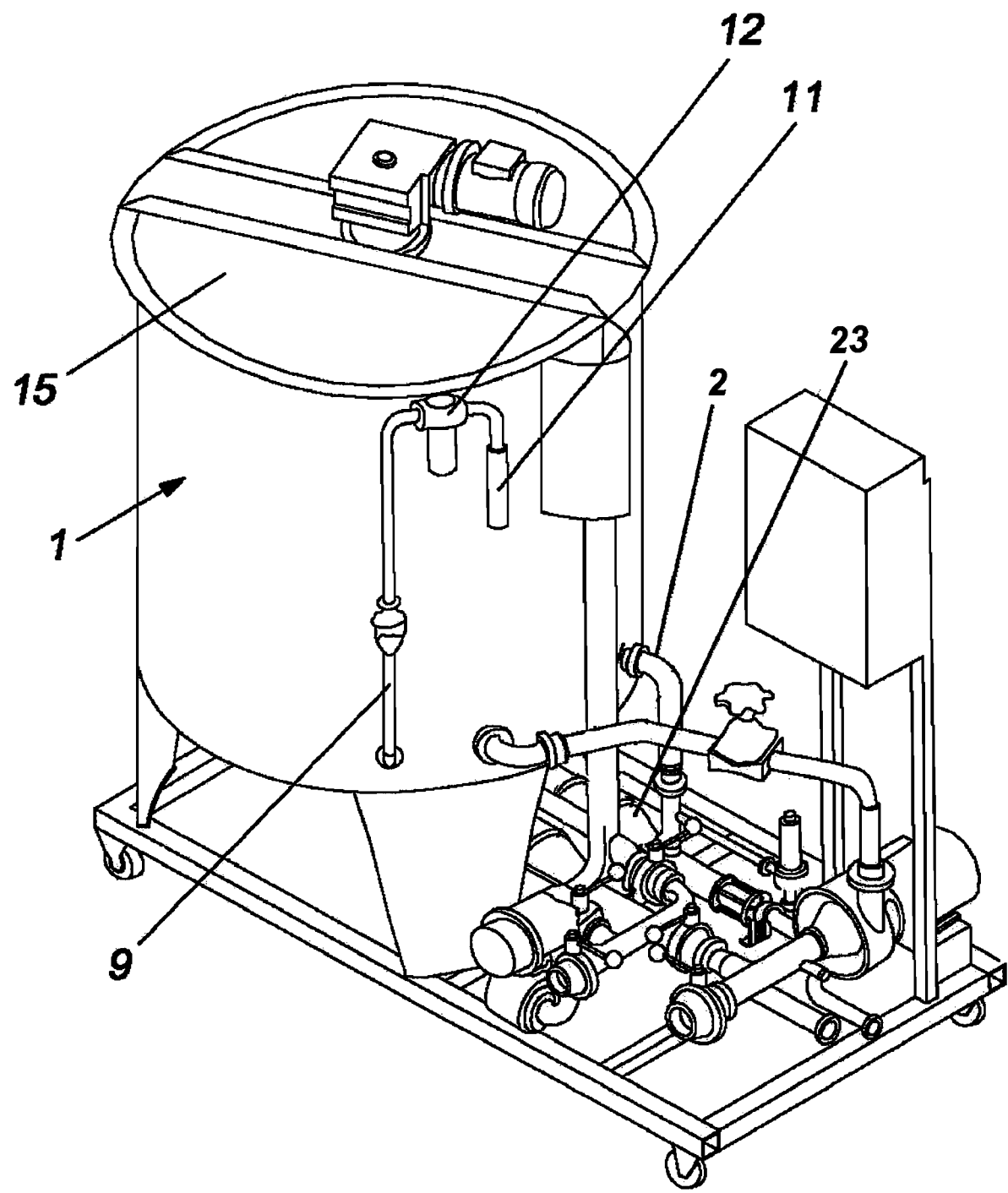
FIG. 1 shows a perspective view of the clarification machine in which the flotation vat can be seen.
Figure 2:
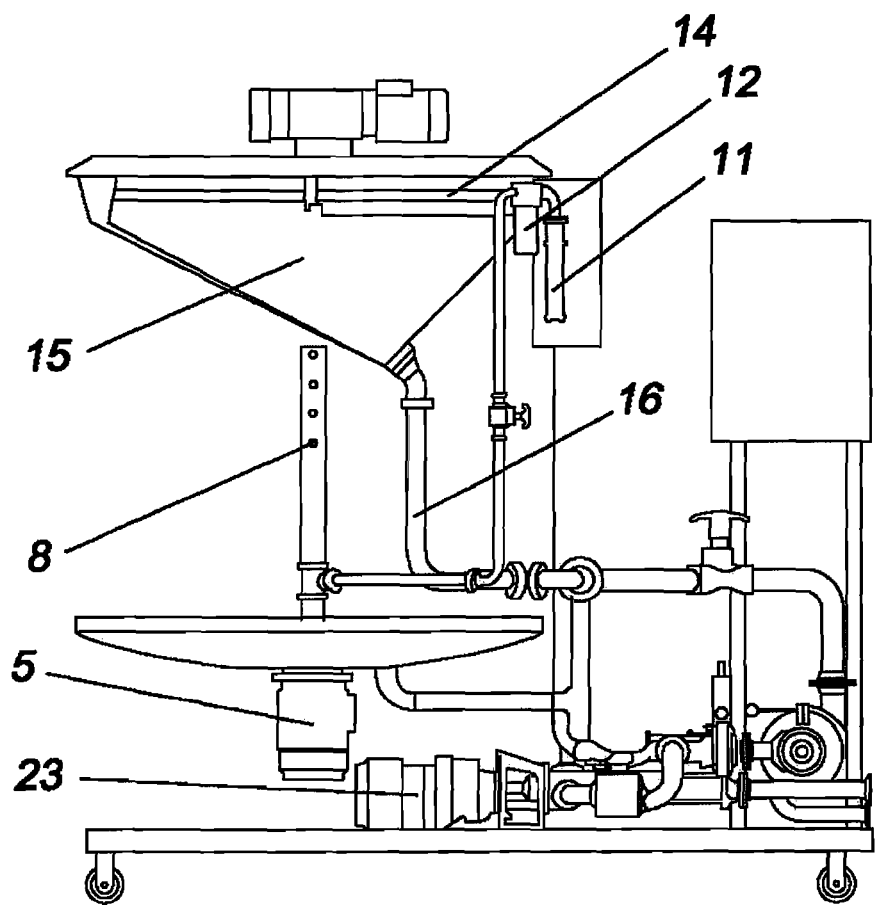
FIG. 2 shows an elevation view of the clarification machine in which the side wall of the flotation vat has been removed so that the air and must inlet pipes can be seen.
Figure 3:
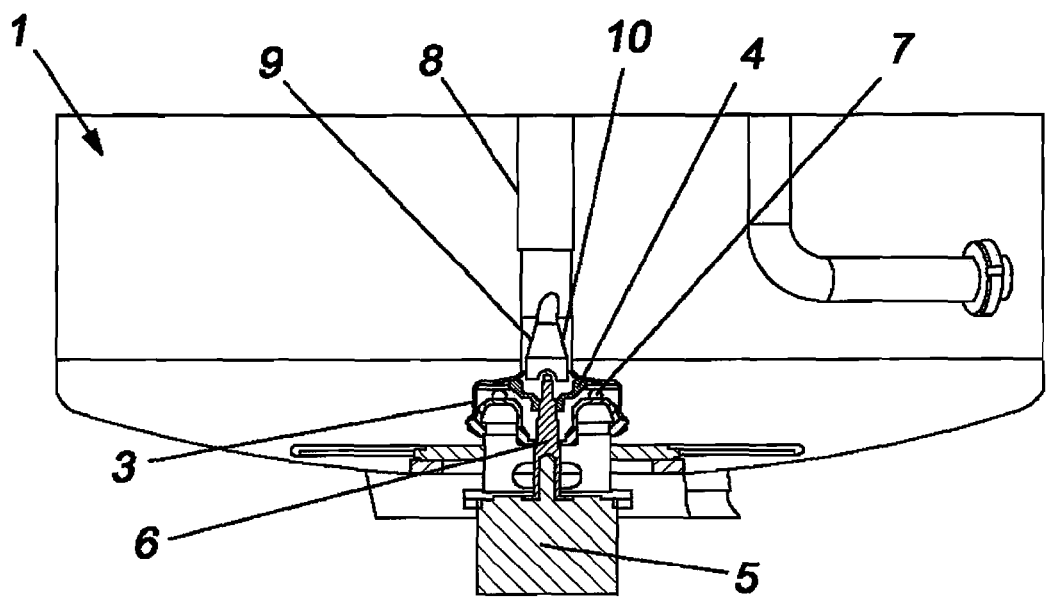
FIG. 3 shows a vertical section of the bottom of the flotation vat in which the circular mixing chamber and the turbine can be seen.
Figure 4:
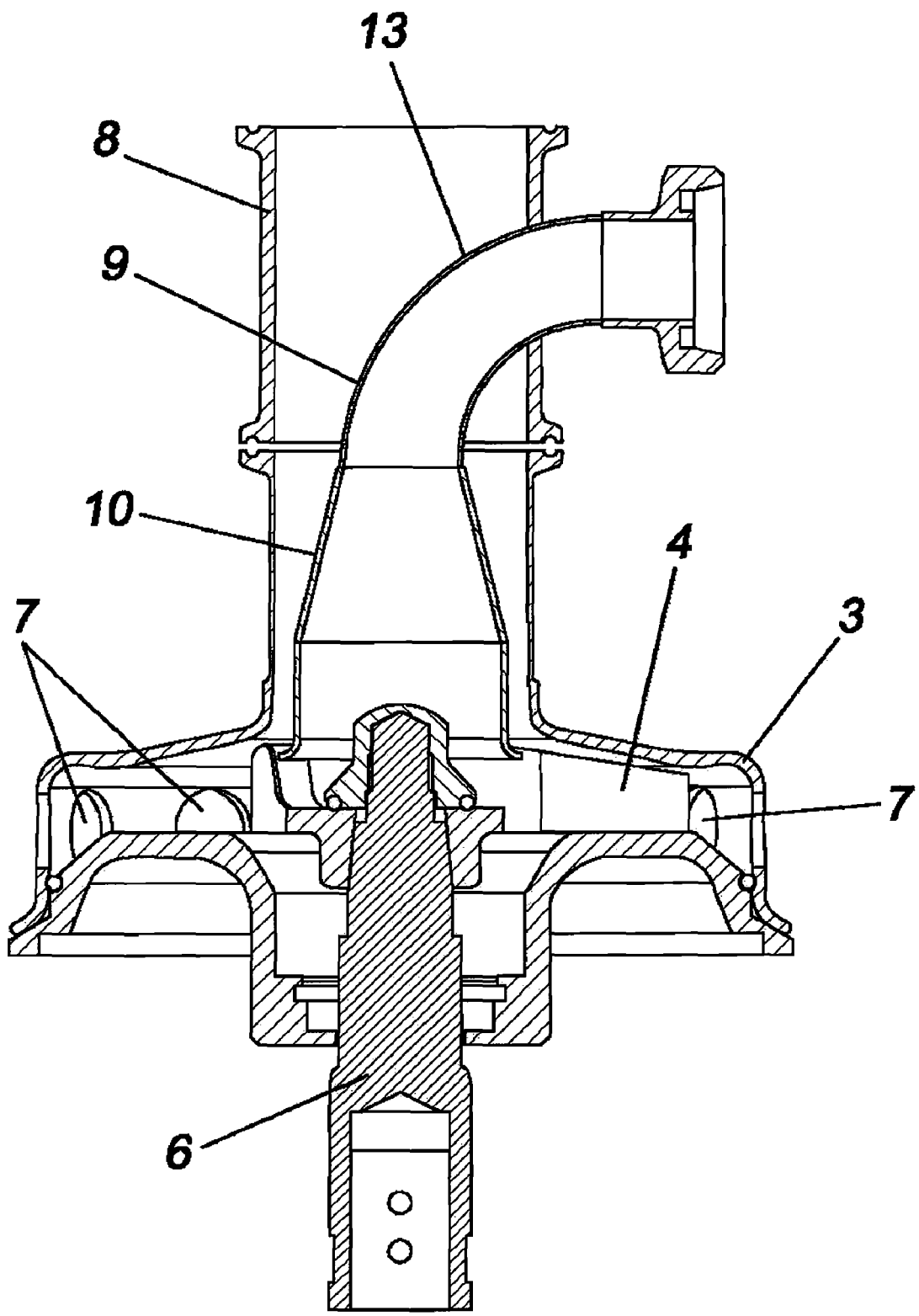
FIG. 4 shows a detailed section of the assembly comprising the circular chamber, the turbine, and the air and must inlet pipes.
Figure 5:
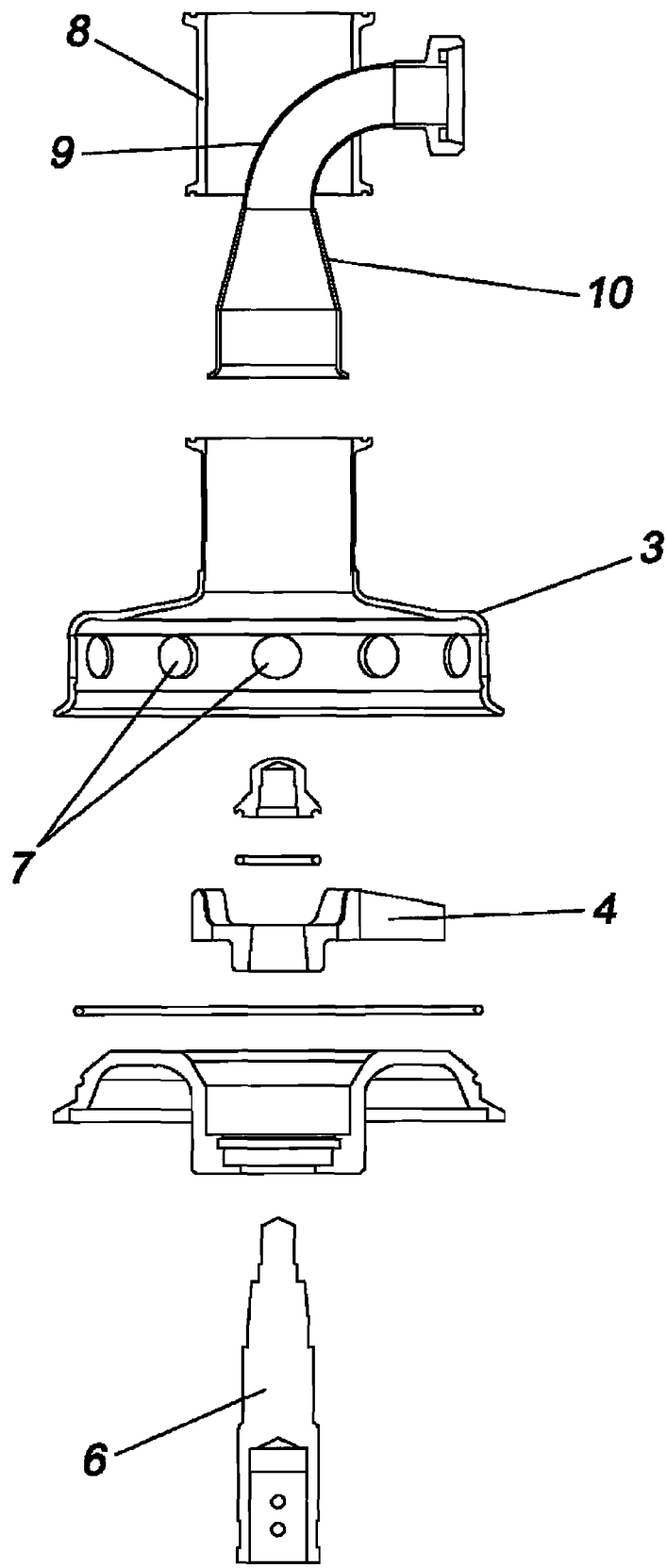
FIG. 5 shows an exploded view of the assembly represented in the previous figure.

It can be seen from the figures how the must clarification machine comprises a flotation vat 1, in which the must derived from grape pressing is introduced through a pipe 2 driven by a pump 23 to clarificate or cleanse the impurities by making them float.

For this purpose, the flotation vat 1 has a circular chamber 3 located at the centre of the vat's internal base, inside which there is a rotating turbine 4 actuated by an external motor 5 whose drive shaft 6 crosses the bottom of the flotation vat 1. The assembly comprising the circular chamber 3 and turbine 4 suck the must contained in the flotation vat 1, mixing it with the air, and expelling it through a plurality of holes 7 made around the periphery of the circular chamber 3. In this way, the must-air mixture is projected over the entire base of the flotation vat 1 continuously, uniformly, and homogeneously.

The inlet or admission of the must and the air into the circular chamber 3, is achieved by means of an opening at the top section of said chamber through two concentric pipes, an external one 8 through which must enters from the flotation vat 1 itself, and an internal one 9 through which the ambient air enters.

For the air to enter or be admitted naturally, the internal pipe 9 is provided with a broadened section 10 at its bottom end, which reduces the cross-section of the external pipe 8 through which the must can pass at the inlet of the circular chamber 3, in order to create a depression which produces suction of the ambient air through the internal pipe 9 by means of the "Venturi" effect.

To prevent suction of foreign particles or insects present in the ambient air, pipe 9 is provided with a filter 11 preventing their entry into the interior of the flotation vat.

Furthermore, the pipe 9 is provided with a valve 12 to regulate the air flow, which in turn determines the size of the air bubbles being created. The size of the air bubbles is determined according to the density and surface tension of the liquid, as well as the density and size of the deposits or impurities. If the air bubbles are very small, their flotation power will not be enough to cause the impurities to float to the surface. If, however, the air bubbles are too big, the flotation speed will be too quick to enable all the impurities to float.

Pipe 9, which conveys the air from the exterior, crosses the must pipe wall 8 through a curved section 13, becoming concentric up to the inlet of the circular chamber.

In this way, as the air bubbles rise within the must, they will cause the deposits and impurities contained in it to float to the surface, where they will be picked up by a rotary rack 14, which will deposit them in a hopper 15 placed inside the flotation vat 1, from which they will be expelled outside through the pipe 16.

The clean must will be collected from an outlet in the flotation vat placed at a point beneath the flotation surface.

Air is incorporated into the flotation process by means of this invention without the need for pressure or the use of an air-compressor unit, which enables an energy saving of around 75%.

As a result of the arrangement of the circular chamber 3 and the turbine 4, homogeneous distribution of the air bubbles is produced throughout the must so that no small volume is left untreated. This also shortens the time in obtaining the desired clarity from the cloudiness compared to other systems.

Being a system that can be used in both continuous and batch mode, the time devoted to clarification is considerably reduced, also eliminating the risk of spontaneous fermentation and hugely reducing the energy consumption necessary to keep the musts cool.

Having sufficiently described the nature of the invention, as well as the practical embodiment of it, it must be noted that the arrangements described above and represented in the attached drawings may be modified provided they do not alter the fundamental principle.

The invention claimed is:

1. A must clarification machine of the type comprising a flotation vat in which must is introduced from grape pressing through a pipe driven by a pump, said vat being provided with means for injecting ambient air and making the impurities contained in the must float, the means comprising:
    a circular chamber placed at the center of the inside base of the vat; and
    a turbine positioned within the circular chamber that is actuated by a motor to rotate and thereby suck the must contained in the flotation vat, mix the sucked-in must with the ambient air, and expelling the mixture through holes made in the periphery of the circular chamber, wherein:
    the must and the ambient air is admitted through an opening made at a top section of the chamber provided with two concentric pipes, an external one of the two concentric pipes provided for the entry of must and an internal one of the two concentric pipes provided for the entry of the ambient air into the chamber,
    the internal pipe is provided with a broadened section at its bottom end which reduces the cross-section through which the must passes at a chamber inlet in order to create a vacuum which causes suction of the ambient air through the internal pipe by means of a "Venturi" effect, and
    a portion of the broadened section of the internal pipe is positioned concentrically within the external pipe.

2. A must clarification machine of the type comprising a flotation vat in which must is introduced from grape pressing through a pipe driven by a pump, said vat being provided with means for injecting ambient air and making the impurities contained in the must float, the means comprising:
    a circular chamber placed at the center of an inside base of the vat; and
    a turbine positioned within the circular chamber that is actuated by a motor to rotate and thereby suck in the must contained in the flotation vat, mix the sucked-in must with the ambient air, and expel the mixture through holes made in the periphery of the circular chamber, wherein:
    the must and the ambient air is admitted through an opening made at a top section of the chamber provided with two concentric pipes, an external one of the two concentric pipes provided for the entry of the must into the chamber and an internal one of the two concentric pipes provided for the entry of the ambient air into the chamber,
    the internal pipe is provided with a broadened section at its bottom end which reduces a cross-section through which the must passes at a chamber inlet in order to create a vacuum which causes suction of the ambient air through the internal pipe by means of a "Venturi" effect, and the internal pipe crosses through an external wall of the external pipe through a curved section, and is concentric with the external pipe at an opening of the circular chamber.

3. The must clarification machine according to claim 2, wherein the internal pipe is further provided with a filter and a valve to regulate the ambient air flow.

4. A must clarification machine of the type comprising a flotation vat in which must is introduced from grape pressing through a pipe driven by a pump, said vat being provided with means for injecting ambient air and making the impurities contained in the must float, the means comprising:

- a circular chamber placed at the center of an inside base of the vat;
- a turbine positioned within the circular chamber that is actuated by a motor to rotate and thereby suck in the must contained in the flotation vat, mix the sucked-in must with the ambient air, and expel the mixture through holes made in the periphery of the circular chamber, wherein:

the must and the ambient air is admitted through an opening made at a top section of the chamber provided with two concentric pipes, an external one of the two concentric pipes provided for the entry of the must into the chamber and an internal one of the two concentric pipes provided for the entry of the ambient air into the chamber, the internal pipe is provided with a broadened section at its bottom end which reduces a cross-section through which the must passes at a chamber inlet in order to create a vacuum which causes suction of the ambient air through the internal pipe by means of a "Venturi" effect, and a portion of the external pipe extends upwardly from the internal pipe, the extended portion of the external pipe comprising a cylinder.

\* \* \* \* \*